Figures 1, 2, 3:
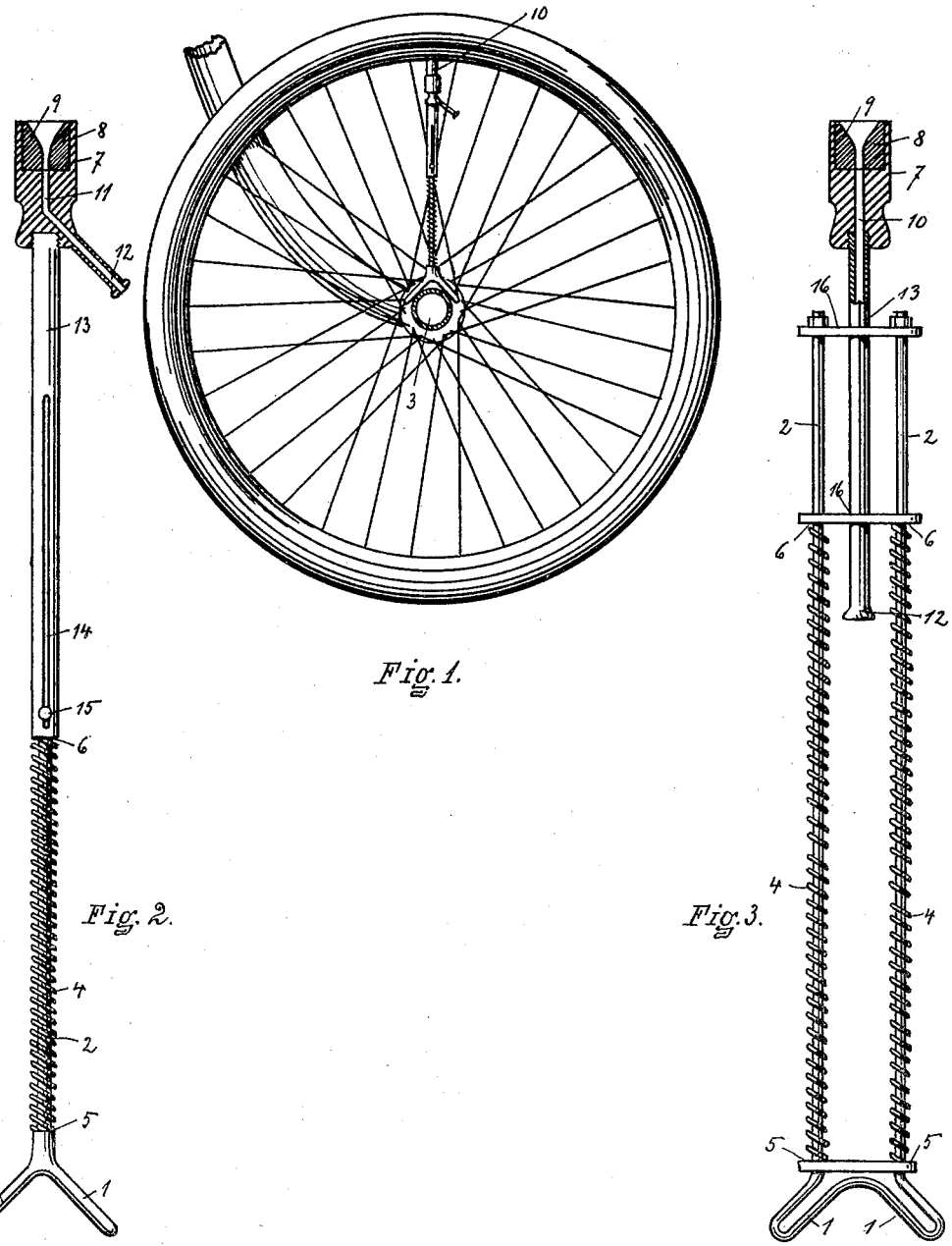

No. 682,387. Patented Sept. 10, 1901.
R. J. PEET.
ELASTIC VALVE ATTACHMENT FOR PNEUMATIC TIRES.
(Application filed Apr. 29, 1901.)
(No Model.)

WITNESSES
Rich. A. George.
Vernon W. Lee.

INVENTOR
Rolland J. Peet.
By Risley & Love
Attorneys.

UNITED STATES PATENT OFFICE.

ROLLAND J. PEET, OF HAMILTON, NEW YORK.

ELASTIC VALVE ATTACHMENT FOR PNEUMATIC TIRES.

SPECIFICATION forming part of Letters Patent No. 682,387, dated September 10, 1901.

Application filed April 29, 1901. Serial No. 57,895. (No model.)

*To all whom it may concern:*

Be it known that I, ROLLAND J. PEET, a citizen of the United States of America, residing at Hamilton, in the county of Madison and State of New York, have invented certain new and useful Improvements in Elastic Valve Attachments for Pneumatic Tires, of which the following is a specification, reference being had therein to the accompanying drawings.

My invention relates to an improvement in an elastic valve attachment for inflating pneumatic tires in vehicles with air; and it consists in the mechanism hereinafter more fully pointed out and claimed.

The purpose and object of my invention are to provide a device having an elastic or yielding nipple or socket for establishing connection between the air-valve of the tire and the air-pump.

In the drawings, Figure 1 represents a side view of a bicycle-wheel, the hub being shown in cross-section, broken lines indicating parts removed and the elastic valve adjustment in position to be operated on by the air-pump. Fig. 2 represents my elastic valve adjustment. Fig. 3 represents the same as Fig. 1 of somewhat different form of construction, although used for the same purpose and to accomplish the same result.

Having described my invention by reference to the figures illustrated in the drawings, I will now proceed to describe the same more in detail, in which similar numerals of reference will refer to corresponding parts in the several views.

Heretofore, so far as I am aware, air-pumps for inflating pneumatic tires have been provided where the connection between the air pump or pressure and the nipple forming the valve which conducts the air into the pneumatic tube consisted in devices which established connection by means of pressure on the valve-stem of the pneumatic tire, the tendency of which is to loosen the valve-stem in the tire, and thereby create a leak which disables the use of the vehicle on which the vehicle-tire is used, and connections have been established with the stem of the air-valve by rubber hose or other means of connecting the air-pump with the stem of the air-valve, which occasions delay and imperfect connections.

My invention consists, essentially, in an independent elastic device, one end of which is supported on a stationary part of the wheel, preferably the hub, the opposite end carrying a rubber socket constructed to fit and establish connection between the stem of the air-valve of the pneumatic tire and the pump, so that the concave nipple in my device can be compressed under spring-pressure and placed under the valve-stem of the tire, where the spring automatically establishes connection, so that when a pump is operated air is forced into the tire, thereby having the pump entirely disconnected from the wheel except by the air-tube.

In the drawings, 1 1 represent the bifurcated lower end of standard 2, which bifurcated end is adapted to fit and be supported on hub 3 or the hub of the wheel provided with the pneumatic tire and readily enables the operator to place the bifurcated end astride the hub of the wheel, which forms a fixed bearing-point.

I provide coil-spring 4, which is fixed over standard 2. The lower end of the spring rests against shoulder 5, which forms a bearing-point for the spring. The upper end of the spring bears against shoulder 6, which shoulder is made movable on the upper end of standard 2.

I provide socket or nipple 7, which has an internal recess in its upper end, into which I fit and secure rubber packing 8, having inclined face 9 for receiving and establishing connection with the valve-stem 10 of the pneumatic tire. The rubber nipple has an opening which registers with air-passage 11, which is connected at 12 with a rubber tube connected with the bicycle-pump or other air-pressure, which is communicated through this air-passage into the pneumatic tire.

The socket or nipple 7 is rigidly secured to movable standard 13, which in Fig. 2 consists in the tube fitting over standard 2 and movable thereon either against or with the spring-pressure, and in this instance I provide an elongated slot 14 with set-screw 15 for limiting its up-and-down movement, while in Fig. 3 I provide yoke 16, which is rigidly secured to standard 13 by solder or any other suitable means, both yokes being secured to said standard 13 rigidly and are free to be moved up and down against or by spring-pressure, the ends being perforated for sliding together vertically on standard 2.

While in the drawings two forms of construction are shown, the best form in which I have practiced my invention is illustrated in Fig. 3.

The socket or nipple is moved either by or against spring-pressure by having the yokes rigidly secured to the standard 13, and their perforated ends fitting over the two standards, on which they are free to move up and down, constitutes a device cheaply constructed and always effective. By placing the bifurcated lower end of the standard on a fixed support, such as the hub of the wheel, and taking the socket or nipple between the thumb and fingers and pressing the nipple downward against spring-pressure and carrying the nipple under the end of the valve-stem 10 and then releasing the hold secured by the thumb and finger the spring operates on the socket or nipple and forces it up, thereby crowding the incline faces of the rubber back over the end of the valve-stem, thereby establishing connection, so that when the air-pressure is applied either by the bicycle-pump or by any other means air is instantly forced into the pneumatic tire in sufficient quantities to inflate the same for use.

My invention permits mechanical modifications and changes without departing from the spirit of my invention.

What I claim as new, and desire to secure by Letters Patent, is—

1. In an attachment for inflating a pneumatic tire, the combination of a standard, a coil-spring on the standard, a nipple mounted to be moved on the standard having an air-passage for connecting with the rubber supply-tube and a rubber packing in the end of the nipple for receiving and making connection with the valve-stem on the tire substantially as set forth for the purpose as stated.

2. In an attachment for inflating a pneumatic tire, the combination of a standard having a bifurcated end for supporting the device on the wheel, a coil-spring on the standard, a nipple having an air-passage and a stem mounted to be moved on the standard and connecting with the air-supply tube and provided at its end with a rubber packing for connecting the same to the stem of the pneumatic tire substantially as set forth.

3. In an attachment for inflating a pneumatic tire, the combination of a pair of standards having a bifurcated connection for engaging the wheel, coil-springs on the standards, a nipple having a rubber packing in its upper end mounted on the standards to be moved into and out of engagement with the valve-stem of the tire and an air-passage through the nipple adapted to be connected to the flexible air-supply pipe substantially as set forth for the purpose as stated.

In testimony whereof I affix my signature in presence of two witnesses.

ROLLAND J. PEET.

Witnesses:
E. C. BUTLER,
CHAS. J. CHEAMAID.